United States Patent Office 3,142,213
Patented July 28, 1964

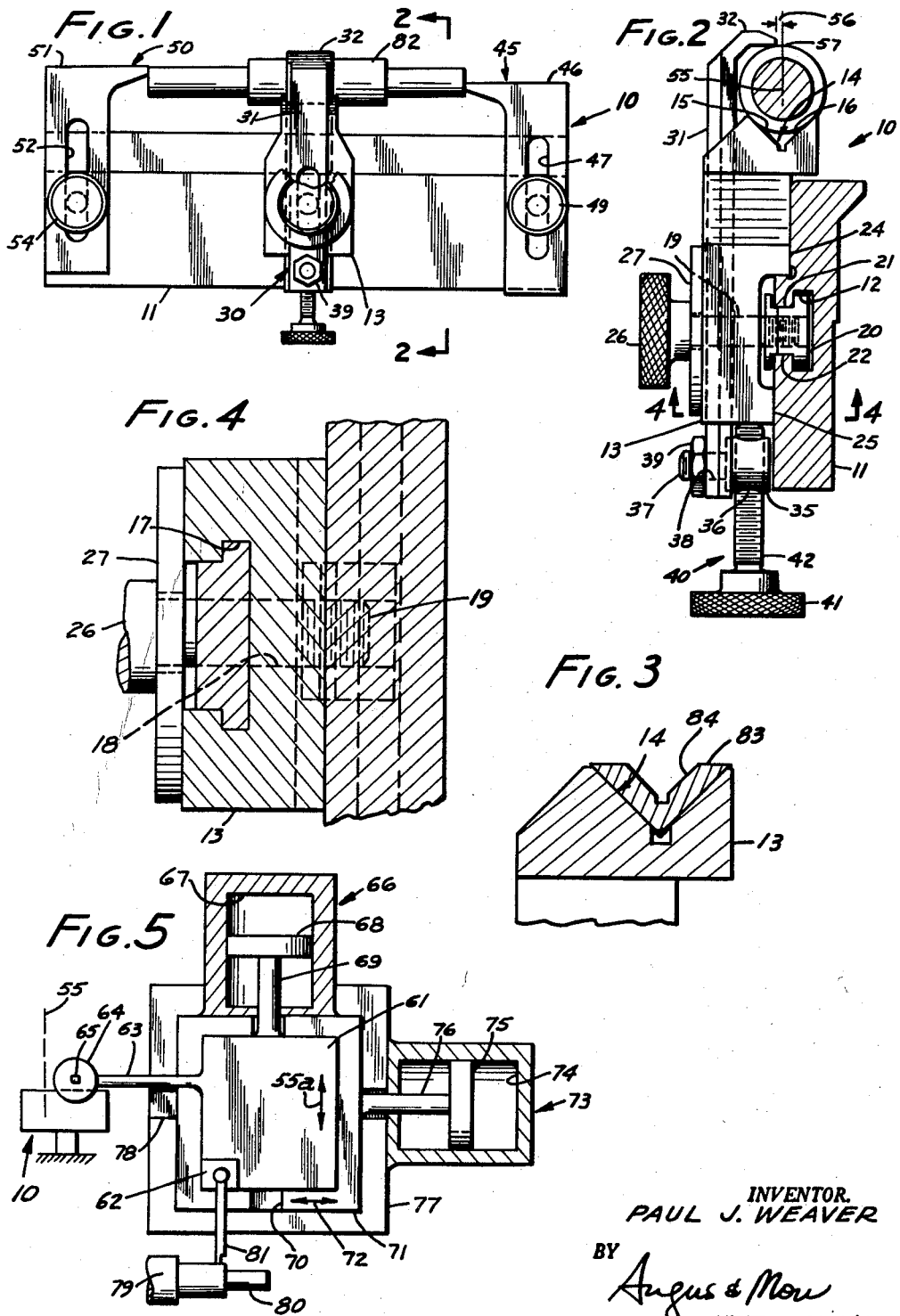
July 28, 1964 P. J. WEAVER 3,142,213
TEMPLATE HOLDER
Filed Feb. 27, 1962
INVENTOR.
PAUL J. WEAVER
BY Angus & Mou
ATTORNEYS.

3,142,213
TEMPLATE HOLDER
Paul J. Weaver, Pasadena, Calif., assignor to True-Trace Corporation, El Monte, Calif., a corporation of Connecticut
Filed Feb. 27, 1962, Ser. No. 175,949
5 Claims. (Cl. 82—14)

This application relates to an attachment for a tracer-controlled lathe.

In the use of tracer-controlled lathes for duplicating parts from a contour, it is desirable to first make a part, and then to use the part as a master from which other parts are duplicated. This objective has been difficult to attain for the reason that there has not been available a template holder which can grasp the part, holding it in a proper alignment and with its contour properly disposed and aligned for contact by the stylus of the tracer valve, and in which the master part can quickly and accurately be so disposed.

It is an object of this invention to provide a means for holding a master part so that it can be used as a template in the reproduction of similar parts.

It is another object of the invention to provide such means in a form whereby the setup operation is quick and easy to carry out. In fact, in practice, not more than five minutes is required to make a completely new setup on a lathe.

This invention is carried out in combination with a lathe which includes a tracer valve, a cutting tool, movable means for supporting the cutting tool and tracer valve so that they move in unison along a plurality of nonparallel axes, a template (master part) bearing a contour to be duplicated as a consequence of the tracking of the tracer valve along the contour, and means for rotating a piece of material which is to be turned to shape.

The invention comprises a template rail extending substantially in the direction of one of the axes. A body, which has a groove that extends parallel to the rail, is adjustably mounted to the rail so that it can be located at a plurality of selected locations. A clamp which comprises an arm and a finger is attachable to the body, the finger being adapted at least in part to overhang the groove. Means is provided for adjustably mounting the arm to the body, whereby the arm may be drawn toward the groove to clamp the template (master part) in the groove.

According to a preferred but optional feature of the invention, the groove is bisected by a line parallel to one of the axes of motion whereby the center of a round template held in said groove is located on the bisecting line, and the length of the finger is such that it does not cross the bisecting line, thereby leaving the contour free to be traced at its intersection with the bisecting line.

According to still another preferred but optional feature of the invention, lead and run-out extension members are attachable to the template rail to guide the stylus of the tracer valve toward and away from the contour to be traced.

The above and other features of this invention will be fully understood from the following detailed description and the accompanying drawings in which:

FIG. 1 is a plan view partly in cutaway cross-section showing the preferred embodiment of the invention;

FIG. 2 is a cross-section taken at line 2—2 of FIG. 1;

FIG. 3 is a fragmentary end view of an adapter for use with the device of FIG. 1;

FIG. 4 is a cross-section taken at line 4—4 of FIG. 2; and

FIG. 5 is a schematic view of a tracer-controlled lathe utilizing a device according to the invention.

FIG. 1 shows a plan view of a template holder 10 according to the invention. The template holder includes a template rail 11. Such a template rail is commonly attached to the frame of the lathe and extends substantially in the direction of one of the machine's axes of movement such as parallel to the longitudinal axis of a lathe. Frequently there is an angular adjustment to enable tapers to be cut. Such an arrangement still falls within the scope of the invention.

A T-slot 12 extends along the template holder in a straight path to provide means for attachment of certain of the elements of the device. The template holder includes a body 13, which has a groove 14 bounded by a pair of planar surfaces 15, 16, which together form a V-groove opening at an end of the body and adapted to extend parallel to the T slot and generally parallel to the template rail. The body further includes a dove tail slide 17. A hole 18 through the body passes a bolt 19. One end of the bolt is threaded into a nut 20, which fits in the T slot and has slots 21, 22, which prevent it from turning. The body includes bearing surfaces 24, 25, which are adapted to be drawn against the template rail by turning knurled nut 26 which is fastened to bolt 19. A washer 27 fits between the knurled nut and the body.

A clamp 30 includes an arm 31, which slides in the dove tail slide, and an integral finger 32. The finger extends transverse to the arm and overhangs at least a part of groove 14.

A rider nut 35 has a transverse threaded opening 36 and a post 37. The post passes through and fits in a hole 38 in the arm. A nut 39 holds the rider nut firmly to the arm.

A clamp nut 40 has a knurled knob 41 mounted to a threaded shank 42 which threads through opening 36 in the rider nut so that its end bears against a surface of the body. Tightening down on the clamp nut draws the finger toward the groove.

A lead extension 45 comprises a plate having a lead surface 46 and a slot 47. A nut in the T slot, (not shown, but identical to nut 20), together with a bolt-knob assembly 49, serve to adjustably position the lead surface.

A run-out extension 50 comprises a plate having a run-out surface 51 and a slot 52. A nut 53 in the T slot (like nut 20) and a bolt-knob assembly 54 provide for adjustably positioning the run-out surface.

With particular reference to FIG. 2, it will be noted that groove 14 is bisected by a line 55 which lies parallel to the axis of movement of one of the machine tool elements. In the case of the lathe illustrated in FIG. 5, it is the movement of the slide which carries the cutting tool. A portion of the stylus of a tracer valve will also intersect this line in the preferred construction. The finger is too short to intersect this line, leaving a clearance 56. Therefore, that portion of the surface (illustrated by point 57) of the master part which lies on line 55 and includes the center of the part is exposed to be contacted by the stylus of a tracer valve. Particularly, when line 55 lies in a plane parallel to the template rail, this arrangement is of particular advantage.

It will also be understood that the template rail could be tilted relative to line 55, but then the geometry relating to alignment of the center and the point of contact with the stylus becomes a relatively complicated matter. As illustrated, the center and the point of contact can readily be aligned when the template rail is disposed as shown.

FIG. 5 is a schematic illustration of a machine tool utilizing a template holder according to the invention. An upper slide 61 is shown which carries a tool holder 62, an arm 63 and a tracer valve 64. The tracer valve includes a stylus 65. The stylus traces over a contour to be duplicated. It is unnecessary to the understanding of this invention to discuss in detail the construction and operation of the tracer valve, nor its connections to motors and power supplies for moving machine tool elements. A full discussion of these elements will be found in applicant's co-pending application, Serial No. 126,383 filed June 1, 1961, entitled "Machine Tool," which is assigned to the same assignee as the instant patent application.

The tool and tracer valve customarily move in unison with each other. An upper slide moves along axis 55a, which is parallel to line 55. It is moved, for example, by fluid motor 66 which includes a cylinder 67, and a piston 68, and a piston rod 69, the rod being connected to the upper slide.

The upper slide is mounted to slideways 70 on a second slide 71. Cylinder 67 is rigidly attached to second slide 71 and moves along axis 72 with the second slide.

The second slide is moved by a second fluid motor 73, which includes a cylinder 74, a piston 75, and a piston rod 76, the rod being attached to the second slide, and the cylinder being attached to a base 77. The second slide moves on slideways 78 on the base.

The base may be the compound of a lathe, or it may be attached to adjustment screws forming essentially a part, perhaps adjustably or power-shiftable, of the frame of a machine, as desired.

A template holder 10, according to the invention, is shown attached to the frame, and the base may be considered, for purposes of illustration, also part of the frame. Also, there is shown a spindle 79, which also may be considered part of the frame adapted to rotate part 80 so that it can be cut to shape by tool 81 held by the tool holder.

The use of the template holder will be evident from FIG. 5. It is used to hold a master part which has to be traced by the stylus of the tracer valve. As the stylus moves along the contour, it controls the application of power to the two fluid motors to move the valve along the contour of the template, and with it the tool along the part. It is unnecessary to the understanding of this invention to show details of initial adjustment means for positioning the tool relative to the tracer valve, these also being shown in the aforementioned Weaver application, Serial No. 126,383.

To set up the invention for use, a master part 82, which may be a part initially manufactured in a conventional manner, is placed in the groove, and the arm is then moved down until the finger tightly clamps the template in place. Then the lead extension is placed next to the part with its edge approximately in line with the center of the master part. The run-out extension is adjusted next to the other end of the master with its surface about even with the last surface to be cut in the tracing movement.

In setting up the device, it is common custom to bottom out the piston in second motor 73 and then adjustably to position the tool so that it will always clear the collet. Then the master part is placed in the V-groove, and the clamp and body are slid along the template rail until the fingers align with a cylindrical portion of the part. The left-hand end of the part as shown in FIG. 5 is about lined up with the stylus at this position. Then the lead and run-out extensions are clamped on as aforementioned, and the device is ready to machine a part.

When small-diameter parts are to be cut, the groove may be too deep and the stylus might be unable to reach the small part. An adapter 83 can then be used, which comprises a V-shaped structure having substantial width which also includes a V-groove 84 against which the part may be brought to bear. The adapter spaces the part outward beyond the body and enables it to be contacted by the stylus.

This invention thereby provides a simple device for the rapid setup of machinery for making both long and short runs of lathe produced parts from a master part. All that is required is a part which has at least one round cylindrical surface for engagement by the device for it to fit into the V-groove. Convenient lead and run-out extensions are provided for convenience in operating the device.

Setup times are very short utilizing this device, and it has been found that quantities even as low as three parts can now be trace-turned faster, and with greater accuracy than by any other method.

In the event that tapers are to be cut on the parts, it is noted that many tracer rails are provided with taper attachments whereby an angular adjustment may be made between the template rail and the frame for adjustably positioning the contour to be traced. Such provisions are common and may readily be utilized with the device of this invention. Also, adapters may be used to align a master part in the groove, should a part have no cylindrical portion. The objective is to properly align the axis of the master part, and suitable adapters can readily be provided.

This invention is not to be limited by the embodiments shown in the drawings and described in the description which are given by way of example and not of limitation, but only in accordance with the scope of the appended claims.

I claim:

1. Apparatus for mounting a round template in a position where its contour can be traced by a tracer valve, comprising: a template rail having a longitudinal slot; a body having a groove extending parallel to the slot; means for mounting the body to the slot at a plurality of locations along the said slot; a clamp comprising an arm and a finger, the finger being attached to the arm, the finger being adapted at least in part to overhang the groove; and means for adjustably mounting the arm to the body, whereby the arm may be drawn toward the groove to clamp the template in the groove.

2. Apparatus according to claim 1 in which the groove is bisected by a line parallel to an axis of a machine tool to which the apparatus is adapted to be attached, whereby the center of a round template is located on said bisecting line, and the length of the finger is such that it does not cross the said bisecting line, thereby leaving the contour free ot be traced at its intersection with said bisecting line.

3. Apparatus for mounting a round template in a position where its contour can be traced by a tracer valve, comprising: a template rail having a slot, a body having a groove extending parallel to the slot; means for mounting the body to the slot at a plurality of locations along said slot; a clamp comprising an arm and a finger, the finger being attached to the arm, said arm being attachable to the body and the finger being adapted at least in part to overhang the groove; a rider nut attached to the arm; a clamp nut having a threaded shank engaged in and passing through a transverse opening in the rider nut and bearing against the body, thereby being adapted to pull the finger toward the groove.

4. Apparatus according to claim 3 in which a first and a second member are attachable to the slot of the template on each side of the body, a first of said members having a lead-in surface adapted to be placed to one side of the part whose contour is to be traced, and to lead a stylus to said part, and the other of said members having a run-out surface adapted to be placed next to the master part for leading the stylus away from said master part.

5. Apparatus according to claim 3 including a V-shaped member adapted to be inserted into the groove of the body for providing a groove of lesser depth to accommodate a template.

References Cited in the file of this patent

UNITED STATES PATENTS

| | | |
|---|---|---|
| 2,326,240 | Malyahn | Aug. 10, 1943 |
| 2,603,117 | Turchan et al. | July 15, 1952 |
| 2,676,507 | Brusque et al. | Apr. 27, 1954 |